Dec. 2, 1952     W. J. PARDUCCI     2,620,123
COOLING SYSTEM FOR COMBUSTION GAS TURBINES
Filed May 31, 1946
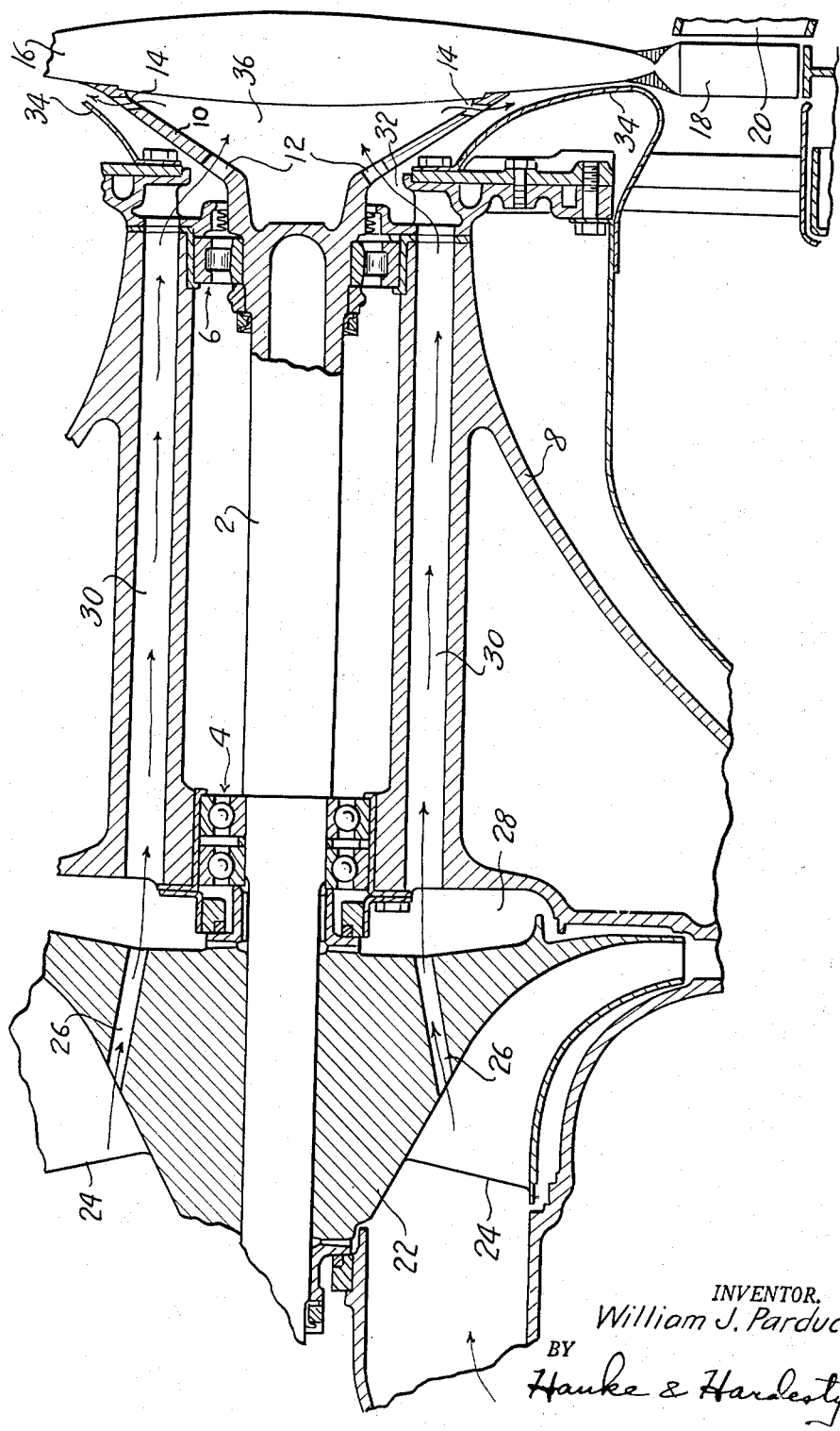
INVENTOR.
William J. Parducci
BY
Hauke & Hardesty
ATTORNEYS Patented Dec. 2, 1952

2,620,123

UNITED STATES PATENT OFFICE 2,620,123

COOLING SYSTEM FOR COMBUSTION GAS TURBINES

William J. Parducci, Yorkfield, Ill., assignor to Continental Aviation & Engineering Corporation, Detroit, Mich., a corporation of Virginia Application May 31, 1946, Serial No. 673,494

3 Claims. (Cl. 230—116)

This invention relates to a cooling system for internal combustion gas turbines, particularly to a system in which the turbine wheel is cooled.

Efficient operation, and corresponding commercial feasibility, of the gas turbine require high operating temperatures. High temperatures present great problems for the designer, especially in the design of the turbine wheel, because the unusually high stresses occasioned by centrifugal force in the rapidly rotating wheel are aggravated by having to operate in a high temperature atmosphere.

It is the object of this invention to provide a cooling system for gas turbines in which low-pressure air is bled off the compressor to cool the wheel.

The sole figure of the drawing shows a partial longitudinal section of a gas turbine embodying this invention.

A shaft 2 is journaled in bearings 4 and 6 in a main casing or support 8. At one end of shaft 2 there is mounted a conical hub 10. The cone forming the hub is arranged to diverge outwardly, away from the shaft as shown. There is one or more openings or perforations 12 in the cone near the shaft axis, and there are numerous openings 14 circumferentially spaced about the hub near its junction with turbine wheel 16. At its periphery wheel 16 carries a plurality of turbine blades or buckets 18 which are supplied with energy fluid from stationary nozzles, one of which is shown at 20.

A suitable air pump such as a centrifugal pump having the impeller 22 is also mounted on shaft 2 for rotation therewith. Impeller 22 is provided with vanes 24 which serve to compress the air during rotation in a manner well known to those skilled in the art. At some point near the shaft axis—i. e., at a low stage of compression—air is bled from the compressor. This is accomplished by the passages 26 which communicate the conventional air passages in the compressor with an annular air space 28 adjacent the impeller. Passages 30 provided in support 8 and circumferentially spaced about shaft 2 communicate the annular air chamber 28 with a second annular air chamber 32 adjacent the perforated hollow wheel hub 10.

An annular member 34 is provided outside the hollow hub 10 and close to but not touching wheel 16. The purpose of member 34 is to confine the air issuing from openings 14 to a space adjacent wheel 16 to provide a maximum of contact of the air with the wheel and thereby provide a maximum of heat transfer from wheel to air. It will be noted from the figure that the air space defined by member 34 and wheel 16 converges radially outward from the shaft axis.

Operation

Low pressure air bleeds off the compressor into the receiving air chamber 28, whence the air is conducted by conduits or passages 30 to the receiving chamber 32. From chamber 32 air passes through the one or more perforations 12 into the space 36 of the hollow hub 10. Here air comes into contact with the central area of wheel 16, effecting some cooling. It will be noted that the wheel will normally be coolest at its center and it is here that the cooling air first impinges against the wheel. Air then flows radially outward through the numerous openings 14 and is constrained into intimate contact with the wheel 16 by annular member 34. The air continues radially outward and mixes with the energy fluid on the exhaust side of blades 18.

I claim:

1. In an internal combustion gas turbine, a compressor, a shaft on which said compressor is drivingly mounted, said shaft terminating in an outwardly flared hub portion remote from said compressor and providing a hollow hub portion, a bladed turbine wheel mounted on said hub portion and provided with a solid central wheel structure closing the open flared end of the hub portion, a shaft supporting structure disposed intermediate the turbine wheel and said compressor and constructed to provide an air chamber immediately adjacent to the rear of the compressor and a second air chamber adjacent the turbine wheel and surrounding the hollow hub portion of the shaft, means carried by the compressor for introducing air under pressure to said first air chamber, said supporting structure provided with one or more air passages connecting said first and second air chambers to conduct air under pressure to said second air chamber, said hollow hub having inlet openings communicating with the second air chamber through which air is introduced into the interior of said hollow hub and outlet openings disposed radially outwardly in said flared hub portion with respect to the inlet openings and located closely adjacent to the turbine wheel, and deflector means carried by the supporting structure and radially outwardly extended alongside said turbine wheel and terminating about in alignment with the inner end of the turbine blades, said air from the hollow hub being ejected through the outlet openings and conducted in close contact with the turbine wheel face.

2. In an internal combustion gas turbine a compressor, a shaft on which said compressor is drivingly mounted, said shaft terminating in an outwardly flared hub portion remote from said compressor and providing a hollow hub portion, a bladed turbine wheel mounted on said hub portion and provided with a solid central wheel structure closing the open flared end of the hub portion, a shaft supporting structure disposed intermediate the turbine wheel and said compressor and constructed to provide an air chamber immediately adjacent to the rear of the compressor and a second air chamber adjacent the turbine wheel and surrounding the hollow hub portion of the shaft, means carried by the compressor for introducing air under pressure to said first air chamber, said supporting structure provided with one or more air passages connecting said first and second air chambers to conduct air under pressure to said second air chamber, said hollow hub having inlet openings communicating with the second air chamber through which air is introduced into the interior of said hollow hub and outlet openings disposed radially outwardly in said flared hub portion with respect to the inlet openings and located closely adjacent to the turbine wheel, and deflector means carried by the supporting structure and radially outwardly extended alongside said turbine wheel and terminating about in alignment with the inner end of the turbine blades, said air from the hollow hub being ejected through the outlet openings and conducted in close contact with the turbine wheel face, said deflector means comprising a sheet metal casing secured at its inner end to the supporting structure and outwardly radially flared to provide a conical shaped shield progressively converging toward said turbine wheel face and being disposed closely adjacent thereto near the outer extremities of said turbine wheel face.

3. In an internal combustion gas turbine, a compressor, a shaft on which said compressor is drivingly mounted, said shaft terminating in an outwardly flared hub portion remote from said compressor and providing a hollow hub portion, a bladed turbine wheel mounted on said hub portion and provided with a solid central wheel structure closing the open flared end of the hub portion, a shaft supporting structure disposed intermediate the turbine wheel and said compressor and constructed to provide an air chamber immediately adjacent to the rear of the compressor and a second air chamber adjacent the turbine wheel and surrounding the hollow hub portion of the shaft, means carried by the compressor for introducing air under pressure to said first air chamber, said supporting structure provided with one or more air passages connecting said first and second air chambers to conduct air under pressure to said second air chamber, said hollow hub having inlet openings communicating with the second air chamber through which air is introduced into the interior of said hollow hub and outlet openings and disposed radially outwardly in said flared hub portion with respect to the inlet openings and located closely adjacent to the turbine wheel, and deflector means carried by the supporting structure and radially outwardly extending alongside said turbine wheel and terminating about in alignment with the inner end of the turbine blades, said air from the hollow hub being ejected through the outlet openings and conducted in close contact with the turbine wheel face, said supporting structure provided with a radially inwardly projecting flange spaced from the outlet end of the air passages and extending closely adjacent to the external face of the hollow flared hub portion of said shaft to deflect the air from said second air chamber into the interior of the hub portion.

WILLIAM J. PARDUCCI.

REFERENCES CITED

The following references are of record in the file of this patent:

UNITED STATES PATENTS

| Number | Name | Date |
|---|---|---|
| 1,368,751 | Rateau | Feb. 15, 1921 |
| 2,117,131 | Auger | May 10, 1938 |
| 2,173,489 | Voigt | Sept. 19, 1939 |
| 2,243,467 | Jendrassik | May 27, 1941 |
| 2,296,701 | Butler | Sept. 22, 1942 |
| 2,364,189 | Büchi | Dec. 5, 1944 |
| 2,401,826 | Halford | June 11, 1946 |
| 2,442,019 | Ray | May 25, 1948 |

FOREIGN PATENTS

| Number | Country | Date |
|---|---|---|
| 847,190 | France | Oct. 4, 1939 |